UNITED STATES PATENT OFFICE.

JONAS W. AYLSWORTH, OF EAST ORANGE, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

METHOD OF FORMING MOLDED ARTICLES.

1,146,391.  Specification of Letters Patent.  Patented July 13, 1915.

No Drawing.   Application filed January 30, 1912.  Serial No. 674,289.

*To all whom it may concern:*

Be it known that I, JONAS W. AYLSWORTH, a citizen of the United States, and a resident of East Orange, in the county of Essex, State of New Jersey, have invented certain new and useful Improvements in Methods of Forming Molded Articles, of which the following is a description.

My invention relates to a process of molding sound records and other objects, the process involving the formation of a surface layer of material upon the smooth polished surface of a metallic plate or other blank mold and the transfer of the same to the surface of the object to be coated under heat and pressure with the firm adhesion or welding of the surface veneer to the object. The surface layer thus formed has a smooth homogeneous surface free from air bubbles, dust particles and the like, and is of a material which is hard when cold, but sufficiently plastic when heated, to take a clear impression from a mold or die, such as a sound record matrix.

The objects of my invention accordingly, are the production of such molded articles and the processes used in the production thereof, as will be more fully described hereinafter.

The present application is, in part, a continuation of my application Ser. No. 579,130, filed August 26, 1910, Method of molding sound records and other objects.

In its preferred form, the process consists essentially in coating the surface of a blank mold or polished plate with a solution or fused film of ingredients, which, upon being heated, form a surface layer or veneer on the mold surface of a hard infusible, insoluble, phenolic condensation product containing plasticity ingredients, such that the veneer becomes sufficiently plastic upon being reheated to take an impression, as stated. The object to be resurfaced is pressed into contact with this hardened veneer in the mold with application of heat sufficient to cause the object and the surface layer to become firmly welded together, the molded object then being cooled and removed from the mold with the surface layer adhering thereto. The coated blank can then be heated and pressed in a sound record or other mold to receive the desired impression upon the surface thus formed. The process is not, however, limited to the use of phenolic condensation products, but may be practised with other substances having the desired properties, as will be described. For example, the surface veneer may be a lacquer composition of celluloid dissolved in suitable solvent and the blank to which the same is transferred in the mold may consist of a gum-like binder and a suitable filler, such as wood flour.

Sound records and other objects having a surface layer are commonly made by forming the surface layer, placing the same upon the backing and then pressing the surface and backing together with sufficient heat to cause adhesion, the desired molded impression being formed at the same time. The advantages of first forming the surface layer upon a blank mold and then transferring the same directly from the mold surface to the backing, over the procedure referred to, are numerous. Where a thin surface layer of desired material, such as material suitable for forming sound records is made, it is usually impossible to handle the same and paste it to the backing without injury to the surface layer or film, because of the fact that the same is very thin and fragile. To overcome this difficulty, such films are often formed on or reinforced with paper or other fabric which is then cemented to the backing. The paper is comparatively rough and porous, and accordingly contains air bubbles and prevents the formation of the desired hard smooth surface upon the surface film when the latter is to receive a sound record or other delicate impression. By my process, no paper or other reinforcing means is necessary and the metal surface upon which the surface film is formed, can be coated with a film entirely free of air bubbles. Another advantage over a process in which a paper strip or the like is used, is that the difference of coefficients of expansion of the varnish film and the paper are such as will ultimately cause the film to crack or have its surface impaired when exposed to extreme heat or cold, which difficulty is overcome by my invention.

In my process, the metal plate or blank mold can be highly finished and the film formed thereon will bear a replica of the same high smooth finish and when this film is transferred in the mold to the backing, the surfaced article thus formed will still bear the same highly polished surface. By this process also the surface of the film, which is subsequently to receive the sound record or other impression, is during the formation of the surface film, next to the metal surface of the blank mold and is accordingly protected at all stages of its formation and drying from dust and other impurities. The atmosphere in rooms where such work is carried on is always charged with dust particles and the smallest particle of dust adhering to the surface of a sound record for example, impairs the perfection of the surface of the sound record impressed thereon. Where varnished paper is used as a surface film, the latter is necessarily exposed to contamination from dust, lint, etc., at some stage of the drying operation in which the articles will be cemented to the outer surface of the same. Furthermore, by my process, if the surface veneer is a hard infusible phenolic condensation product and the backing contains rough particles or a fibrous filler, the backing being carefully made to have a substantially uniform thickness and density, the fibers or other rough elements of the backing cannot be impressed through the surface film during subsequent pressing because of the hardness of the surface material used. If the surface layer is made of materials which are less hard than that mentioned and the backing is of a varying thickness or density, some of the fibers or high spots of the backing are apt to be forced through the surface of the coated article in spots where the greatest pressure occurs, thus impairing the perfection of the sound record or other impression made.

In practising the invention, the polished surface of a blank mold may be painted with or dipped in a solution of the ingredients or the same may be applied to the surface of the mold by spraying in a uniform manner. The material applied to the blank surface may be a solution of a fusible soluble phenolic condensation product, such as the phenol resin described in my application, Ser. No. 496,060, filed May 14, 1909, upon which application U. S. Patent No. 1,102,630 has been granted, together with a hardening agent therefor containing the methylene radical, such as hexa-methylene-tetra-amin, in a suitable solvent which may be either a volatile solvent, such as amyl alcohol, or a solid solvent, such as mono-nitro-naphthalene or other solvents referred to in my application, Ser. No. 496,060 referred to, or penta-chloro-phenol or other solvents referred to in my application Ser. No. 604,982, filed January 27, 1911, Plastic phenolic condensation products, upon which last named application U. S. Patent No. 1,046,137 has been granted. The veneer or coating formed upon the blank mold may be the enamel lacquer or varnish described in my application Ser. No. 543,239, filed Feb. 11, 1910, upon which U. S. Patent No. 1,098,608 has been granted. If a volatile solvent is used, it should be one whose boiling point is higher than the temperature at which it is desired to perform a final hardening reaction of the substance in solution into a refractory insoluble infusible condensation product. The veneer coating may contain a solid solvent or plasticity ingredient, such as penta-chlorophenol. Having coated the blank mold the same is dried, and heated sufficiently to cause the ingredients of the coating to react to form the final infusible insoluble refractory product referred to. The article to be coated, such as a blank phonograph record, which is preferably made of a phenolic condensation product or a mixture of the same with an inert filling material, is then pressed in the blank mold into contact with the surfacing layer formed in the blank mold as described, heat being applied sufficiently to cause the welding of the surface layer to the blank, and the transfer of the surface layer from the blank mold to the blank or backing upon the cooling and withdrawal of the backing from the mold. In some cases it will be well to varnish the surface of the blank or backing which is to be welded to the veneer film with some of the unhardened varnish before the backing is pressed into contact with the veneer to aid the adhesion of the two. The coated article, such as a blank phonograph record, which is thus formed with a smooth hardened surface layer, may be then pressed into or against a heated phonograph record matrix or other mold the blank also being heated if necessary. Because of the character of the surface layer of the article and the presence therein of a plasticity component, such as described in my application Ser. No. 496,060, referred to, the sound record or other impression is formed in the surface thereof by the matrix in much the same manner that a similar record or impression is formed upon a heated celluloid blank pressed into a mold. The molded object thus formed is cooled and withdrawn from the mold.

As stated, the above described process may be carried out broadly with the use of other compositions than those described. Thus the veneer surface may be formed of celluloid dissolved in a suitable solvent, such as amyl acetate or alcohol and ether and the blank or backing may be composed of a gum-like binder and a suitable filler such as wood flour or infusorial earth or a mixture of the same, such a composition consisting of approximately 100 parts of gum-like binder, and 100 to 300 parts of filler. Suitable binders are mentioned in the next paragraph. The blank or backing in each case should be compressed and have a smooth polished surface before the same is pressed into contact with the veneer surface. In the case last referred to, the blank may be coated with a varnish such as gutta percha solution to facilitate the transfer of the surface veneer thereto, when the binder of the backing is not of itself sufficiently adhesive to cause the veneer film to be transferred thereto when the heated blank is pressed into contact with the veneer. In addition to the substances referred to for the formation of the surface veneer, films formed of cellulose acetate or other cellulose esters may be used which may have compounded therewith a chlorinated fatty acid or derivative thereof, such as described in my Patent No. 855,556, dated June 4, 1907. Or the surface veneer may be formed from a varnish composition, comprising a cellulose ester, as acetyl cellulose, and a phenol or cresol resin, dissolved in acetylene-tetra-chlorid, with or without the addition of a halogenized fatty acid or derivative, and a small percentage of hexa-methylene-tetra-amin, all as is described in my application Ser. No. 668,942, filed Jan. 2, 1912, upon which U. S. Patent No. 1,094,830 has been granted.

The blank or backing should be made thermo-plastic or "hot plastic," that is, have the property of becoming plastic when heated, in equal or greater degree than the surface film. The binder used in the backing may be shellac, copal gum, kauri, resin, or mixtures of the same, or a phenolic condensation product, preferably a fusible soluble phenol resin, such as that referred to above.

In the formation of disk phonograph records or other sound records in practising this invention, I preferably proceed as follows:—A disk is formed from a powder which comprises approximately two parts of wood flour or other suitable filler and one part phenol resin or equivalent. This disk is made as nearly uniform in thickness and density as may be but certain parts of the surface thereof will be somewhat porous or slightly depressed. The surface of this disk or backing is then lacquered with some of the varnish composition of which the veneer is to be made, the lacquer being applied to the porous or depressed spots on the blank to fill the same up. The disk is then dried, repressed in polished dies at a pressure which is somewhat less than the disk will thereafter be subjected to when the sound record impression is impressed on the surface veneer. The varnish may suitably be applied to the disk by spraying.

A hardened veneer is formed on a metallic smooth plate by coating the same as by spraying with a lacquer comprising approximately 100 parts phenol resin, 20 parts penta-chloro-phenol, 4 parts naphthalene, 6 to 8 parts hexa-methylene-tetra-amin, all dissolved in 130 parts denatured alcohol or other solvent. This is dried and the excess of solvent eliminated by placing the metal plate with the lacquer thereon in an oven, and gradually raising the temperature over a period of ten hours up to 160° F. after which the temperature is raised to approximately 220° F. for a sufficient length of time to cause the reaction of the hexa-methylene-tetra-amin and phenol resin to form an infusible condensation product containing the penta-chloro-phenol as a plasticity ingredient. After the reaction is complete, the oven is allowed to cool down gradually to prevent cracking of the veneer.

When the veneer has been formed upon its metallic plate or blank mold, the blank disk previously formed as described, is welded to the veneer on the plate by pressing the blank into contact with the veneer at a less pressure than that at which the blank has been previously compressed, the pressure used not being sufficient to cause the blank to flow. The veneer is transferred from the metallic plate to the blank in this operation. Thereafter, if the sound record is to be formed upon the blank thus made, a record of the sound waves may be impressed upon the surface of the blank from a metallic matrix in such a manner as not to produce excessive flow of the base. By this means is formed a compound record disk having a hard but hot plastic surface and a plastic backing or body, there being, if desired, a record bearing surface veneer upon both sides of the backing. The backing consists of a substance which softens under the application of heat but which is given stiffness and ability to withstand excessive flow under pressure by the fibrous filler. Such a compound disk is permanently thermo-plastic both in the surface portion and in the backing and can be repressed a number of times successfully. In the case of sound records particularly, the lacquering of the body portion of the disk all over and especially at the porous spots is made to prevent "crackles" in the sound record, since it is difficult to make the body of the powdered resin or similar material containing a large amount of fibrous filler, without producing porous spots at the surface.

The process which I have described is an extremely cheap and practical method for manufacturing molded objects, such as those described, because of the comparative cheapness of the blank molds in which the surface veneer is formed.

The specific embodiment of my improved process in which the coating is transformed into the hardened product and at the same time secured to the blank is claimed in my copending application Serial No. 590,602, which is a division of my application Serial No. 579,130 referred to. The article described herein is claimed in my copending application Serial No. 861,037, filed September 10, 1914, which is a division of this application.

Having now described my invention what I claim and desire to protect by Letters Patent is:—

1. The process of molding articles, which consists in forming a coating of a final hard phenolic condensation product, which is infusible but somewhat plastic when heated, upon the surface of a blank mold, then pressing an article to be coated into contact with the coating in the mold with application of heat to cause the coating to firmly adhere to the article, then removing the coated article from the blank mold, and finally pressing the same with sufficient application of heat into a suitable mold to cause the desired form to be given to the surface of the coated article, substantially as described.

2. The method of molding articles, which consists in coating a mold with a solution of substances which react chemically upon application of heat to form a hard phenolic condensation product which is infusible but somewhat plastic when heated, drying the said coating, heating the same to cause the ingredients to react as aforesaid, pressing substance to be coated into contact with the coating on the mold while applying sufficient heat to cause the substance to become firmly welded to the coating, removing the coated substance from the mold, and pressing said substance into a matrix with sufficient heat to cause an impression to be formed in the coating substantially as described.

3. The process of forming sound records and other objects which consists in forming upon the highly polished surface of a blank mold a dried veneer of moldable material of such a nature as to become sufficiently plastic when heated to take an impression and free from air bubbles and extraneous particles, pressing a blank into contact with said veneer in the mold with application of heat, the said veneer and blank being of such a nature as to adhere firmly under such application of heat and pressure, withdrawing the blank with the veneer adhered thereto from the mold, and pressing the same with sufficient application of heat into a matrix to cause an impression to be formed on the veneer, substantially as described.

4. The process of forming molded articles which consists in forming upon the smooth surface of a mold a coating of permanently thermo-plastic surfacing material, then pressing an article to be coated into contact with the coating in the mold with application of heat, the said coating and article being of such a nature as to adhere or be welded firmly under such application of heat and pressure, removing the coated article from the mold, and finally pressing the same with sufficient application of heat into a suitable mold to cause the desired form to be given to the coated article, substantially as described.

5. The process of forming articles having a smooth homogeneous surface adapted to subsequently receive an impression, which consists in forming a base of plastic material, lacquering the surface of the same at porous or depressed spots, drying and pressing against a polished die, forming upon the surface of a polished blank mold a hardened veneer of material of such a nature as to become sufficiently plastic, when subsequently heated, to take an impression, pressing the said base into contact with the said veneer in the mold, with application of heat, the said veneer and base being of such a nature as to adhere firmly under such application of heat and pressure, and withdrawing the coated object from the mold, substantially as described.

6. The process of forming articles having a smooth homogeneous surface adapted to subsequently receive an impression, which consists in forming a disk of material comprising a fusible phenolic condensation product and a filling material, pressing the same at a desired pressure, forming upon the surface of a polished plate a veneer of a hardened infusible phenolic condensation product of such a nature as to become sufficiently plastic on subsequent application of heat, to receive an impression, pressing the said disk into contact with the said veneer upon the said plate under a pressure somewhat less than the first mentioned pressure, and with application of heat sufficient to cause the transfer of the veneer from the plate to the disk, and the welding of the same together, and withdrawing the coated disk from the said plate, substantially as described.

7. The process of molding articles which consists in forming a base of a material which is hard when cold but deformable at elevated temperatures and which contains a finely divided filling material, pressing the same at a desired pressure and temperature against a smooth surface, forming upon the surface of a polished plate a veneer of hard material of such a nature as to become sufficiently plastic on subsequent application of heat to receive an impression, pressing the said base into contact with the said veneer upon said plate under a pressure somewhat less than the first mentioned pressure and with application of sufficient heat to cause the transfer of the veneer from the plate to the base, withdrawing the coated base from the said plate, and pressing the same with sufficient application of heat into a suitable mold to cause a desired impression to be formed in the veneer, substantially as described.

8. The process of forming articles having a smooth homogeneous surface adapted to subsequently receive an impression, which consists in forming a base of a material which is hard when cold but deformable at elevated temperatures, and which contains a fibrous or powdered filling material, varnishing the surface of the same at any porous or depressed spots with a solution of a material of characteristics similar to those of the base material, drying and pressing the base against a polished surface, and transferring to the surface of the base thus prepared a veneer of hard but hot-plastic material, formed upon a polished surface, and welding the veneer firmly to the said base under heat and pressure, substantially as described.

9. The process of molding sound records and other objects which consists in forming upon the surface of a blank mold a coating of ingredients which react upon application of heat to form a final hardened phenolic condensation product which which is somewhat plastic when heated, heating said coating to form said final hardened condensation product, pressing a blank into contact with the coating in the mold with application of heat to cause the coating to firmly adhere to the blank, removing the coated blank from the mold, and pressing the same with application of sufficient heat into a matrix to cause an impression to be formed on the coating of the blank, substantially as described.

10. The process of molding sound records and other objects which consists in forming upon the highly polished surface of a blank mold a coating of ingredients which react upon application of heat to form a final hardened condensation product which is sufficiently plastic when heated to take an impression and free from air bubbles and extraneous particles, heating said coating to form said final hardened condensation product, pressing a blank into contact with the coating in the mold, with application of heat to cause the coating to firmly adhere to the blank, removing the coated blank from the mold, and pressing the same with sufficient application of heat into a matrix to cause an impression to be formed on the coating of the blank, substantially as described.

11. The process of molding articles which comprises coating the highly polished surface of a mold with a solution of surfacing material free from air bubbles and extraneous particles, then transforming the coating into a hardened permanently thermoplastic condition, then pressing an article to be coated into contact with the coating in the mold with application of heat, the said veneer and article being of such a nature as to adhere firmly under such application of heat and pressure, withdrawing the coated article from the mold, and subsequently pressing the coated article with sufficient application of heat into a suitable mold to cause a desired impression to be formed in the coated surface thereof, substantially as described.

12. The process of forming articles having a smooth homogeneous surface adapted to subsequently receive an impression which comprises forming a base of thermo-plastic material, forming upon the highly polished surface of a mold a veneer of material which is hard and infusible but permanently thermo plastic, then pressing said base into contact with said veneer with application of heat sufficient to cause the transfer of the veneer from the mold to the base and the welding of the veneer and base together, withdrawing the coated base from the mold, and subsequently pressing the coated base with sufficient application of heat into a suitable mold to cause a desired impression to be formed in the coated surface of the base, substantially as described.

13. The method of molding articles, which consists in coating a mold with a solution comprising a methylene containing substance, a soluble phenolic condensation product capable of reacting with said substance on application of heat to form a hard infusible product, and a plasticity agent dissolved therewith, heating the coating on the mold to cause the ingredients to react and form a hard infusible product, pressing a substance to be surfaced into contact with the said coating while applying sufficient heat to cause the substance to become firmly welded to said coating, removing the coated substance from the mold, and pressing said substance with application of sufficient heat into a matrix to cause an impression to be formed in the coating, substantially as described.

14. The method of molding articles, which consists in coating a mold with a solution of substances which react on application of heat to form a hard phenolic condensation product which is infusible but somewhat plastic when heated, drying the coating on the mold, and heating the same to cause the ingredients to react as aforesaid, pressing an article containing a phenolic condensation product into contact with the said coating while applying sufficient heat to cause the article to become firmly welded to the said coating, removing the coated article from the mold, and pressing said article with application of sufficient heat into a matrix to cause an impression to be formed in the coating thereon, substantially as described.

15. The method of molding articles which consists in coating a mold with a solution of substances capable of transformation on application of heat into a hard final phenolic condensation product, in a solvent having a boiling point higher than the temperature at which the hardening transformation is to be carried out, causing the final hardening transformation with application of heat, pressing a substance to be surfaced into contact with the coating on the mold while applying sufficient heat to cause the substance to become firmly welded to the said coating, and pressing said substance with application of sufficient heat into a matrix to cause an impression to be formed in the said coating, substantially as described.

16. The process for forming sound records and other objects which consists in forming upon the surface of a blank mold a veneer of material of such a nature as to become sufficiently plastic when heated to take an impression, pressing a blank comprising a binder and a finely divided fibrous filler into contact with said veneer in the mold with application of heat, the said veneer and blank being of such a nature as to adhere firmly under such application of heat and pressure, withdrawing the blank with the veneer adhering thereto from the mold, and pressing the same with sufficient application of heat into a matrix to cause an impression to be formed on the veneer, substantially as described.

17. The process for forming sound records and other objects which consists in forming upon the surface of a blank mold a veneer of material of such a nature as to become sufficiently plastic when heated to take an impression, pressing a blank comprising wood flour and a binder therefor into contact with said veneer in the mold with application of heat, the said veneer and blank being of such a nature as to adhere firmly under such application of heat and pressure, withdrawing the blank with the veneer adhering thereto from the mold, and pressing the same with sufficient application of heat into a matrix to cause an impression to be formed on the veneer, substantially as described.

18. The process for forming sound records and other objects which consists in forming upon the surface of a blank mold a veneer of material of such a nature as to become sufficiently plastic when heated to take an impression, pressing a blank comprising a binder and a finely divided fibrous filler into contact with said veneer in the mold with application of heat, the filler being in excess of the binder and the said veneer and blank being of such a nature as to adhere firmly under such application of heat and pressure, withdrawing the blank with the veneer adhering thereto from the mold, and pressing the same with sufficient application of heat into a matrix to cause an impression to be formed on the veneer, substantially as described.

19. The process of forming molded articles having a smooth surface adapted to subsequently receive an impression, which consists in forming a base of suitable material, lacquering the surface of the same at porous or depressed spots, drying the same, forming upon the surface of a suitable mold a veneer of moldable material, pressing the said base into contact with the said veneer in the mold with application of heat, the said veneer and base being of such a nature as to adhere firmly under such application of heat and pressure, and withdrawing the coated base from the mold, substantially as described.

This specification signed and witnessed this 19th day of January 1912.

JONAS W. AYLSWORTH.

Witnesses:
DYER SMITH,
HENRY SHELDON.

It is hereby certified that in Letters Patent No. 1,146,391, granted July 13, 1915, upon the application of Jonas W. Aylsworth, of East Orange, New Jersey, for an improvement in "Methods of Forming Molded Articles," errors appear in the printed specification requiring correction as follows: Page 3, line 33, for the word "resin" read *rosin;* page 4, line 30, after the word "pressing" insert the article *a;* page 5, line 27, strike out the word "which," second occurrence; and that the said Letters Patent should be read with these corrections therein that the same may conform to the record of the case in the Patent Office.

Signed and sealed this 28th day of September, A. D., 1915.

[SEAL.]

J. T. NEWTON,
*Acting Commissioner of Patents.*